United States Patent Office 3,349,075
Patented Oct. 24, 1967

3,349,075
MONOAZO DYES FOR HYDROPHOBIC FIBERS
David J. Wallace and Max A. Weaver, Kingsport, Tenn., assignors to Eastman Kodak Company, Rochester, N.Y., a corporation of New Jersey
No Drawing. Filed May 1, 1963, Ser. No. 277,118
8 Claims. (Cl. 260—158)

This invention relates to azo compounds particularly useful as dyes for coloring textile materials.

The azo compounds of the invention have the following general formula

I
$$R-N=N-R_1-N\begin{matrix}R_2\\ \\R_3-CONH_2\end{matrix}$$

wherein
R = a monocyclic 2-thiazolyl radical, that is, a radical having the formula $$\begin{matrix}N\\ \parallel\\ V\quad C-\\ \diagdown\;/\\ S\end{matrix}$$

in which V is a vinylene group, including substituted and unsubstituted vinylene, mono- and di-substituted vinylene groups, such as $$-CH=CH-,\quad -CH=CH-\\ \qquad\qquad\qquad\qquad |\\ \qquad\qquad\qquad\quad NO_2$$

and $$-C=C-\\ |\quad |\\ CH_3\;\;COCH_3$$

as present in 2-aminothiazole and the subsituted 2-aminothiazoles described in the examples below; the nitro, lower alkylsulfonyl, lower alkyl, lower aliphatic acylamido, lower carboalkoxy, lower aliphatic acyl and cyano substituted 2-aminothiazles being particularly efficacious for use in making the azo compounds;

Herein, "lower alkyl," "lower alkoxy," "lower aliphatic acyl" groups etc., mean the group contains a straight or branched-chain alkyl group of 1 to carbon atoms.

$R_1$ = a monocyclic arylene group of the benzene series, i.e., phenylene and substituted phenylene, e.g., m-Cl-phenylene—⟨  ⟩—
                 |
                 Cl in which the chlorine atom is in the position meta to the nitrogen atom to which both $R_2$ and $R_3$ are attached, m-(OCH₃)phenylene—⟨  ⟩—
                    |
                    CH₃O— m-tolylene—⟨  ⟩—    —o-tolylene—⟨  ⟩—
            |                     |
            CH₃                   CH₃ or in the radical $$-R_1-\underset{\underset{R_2}{|}}{N}-R_3-$$

$R_1$ together with $R_2$ and the nitrogen atom form the 6-tetrahydroquinolyl radical or a substituted 6-tetrahydroquinolyl radical such as $$H_3C-\underset{\underset{CH_2CH_2-CONH_2}{|}}{\overset{S}{\underset{N}{\bigcirc\!\bigcirc}}}-CH_3$$

present in the compound of Example 8 below, as well as the 2,2,4,7-tetramethyl-6-tetrahydroquinolyl radical, $R_2$ = H, alkyl, e.g., lower alkyl, lower hydroxyalkyl and lower cyanoalkyl groups such as methyl, hydroxyethyl and cyanoethyl, $R_3$ = lower alkylene, e.g., methylene, ethylene, propylene, butylene. The azo compounds are free of water solubilizing $SO_3H$ and COOH groups.

The novel azo compounds are prepared by diazotizing 2-aminothiazoles and coupling in a well-known manner with N-carboxamidoalkylaniline coupling components having the general formula II
$$H-R_1-N\begin{matrix}R_2\\ \\R_3-CONH_2\end{matrix}$$

wherein $R_1$, $R_2$ and $R_3$ have the same meaning as given above.

The coupling components can be prepared by reacting the corresponding nitriles having the formula III
$$H-R_1-N\begin{matrix}R_2\\ \\R_3-CN\end{matrix}$$

in which $R_1$, $R_2$ and $R_3$ are as described above, with sulfuric acid followed by treatment with ammonia as described in our co-pending U.S. patent application Ser. No. 277,117, filed May 1, 1963, and now abandoned.

The N-carboxamidoalkyl-N-cyanoalkylaniline couplers are made by cyanoalkylation of the appropriate N-carboxamidoalkylaniline in the presence of a little acetic acid. The N - carboxamidoalkyl - N - hydroxyalkylaniline couplers are made by action of alkylene oxides on the appropriate N-carboxamidoalkylaniline in an autoclave at elevated temperatures and pressures.

Representative N-carboxamidoalkylaniline compounds of Formula II useful in preparing the azo compounds of the invention are as follows:

N-β-carboxamidoethyl-N-ethyl-m-toluidine
N-β-carboxamidoethyl-N-ethyl-m-chloroaniline
N-β-carboxamidoethyl-N-ethyl-m-anisidine
N-β-carboxamidomethyl-N-ethylaniline
N-β-carboxamidoethyl-o-toluidine
N-β-carboxamidoethyl-1,2,3,4-tetrahydroquinoline
N-β-carboxamidoethyl-2-methyl-1,2,3,4-tetra-
   hydroquinoline
N-β-carboxamidoethyl-2,7-dimethyl-1,2,3,4-tetra-
   hydroquinoline
N-β-carboxamidoethyl-2,4,7-trimethyl-1,2,3,4-tetra-
   hydroquinoline
N-β-carbboxamidoethyl-2,2,4,7-tertramethyl-1,2,3,4-
   tetrahydroquinoline
N-β-carboxamidobutyl-N-ethylaniline
N-β-carboxamidoethyl-N-β-hydroxyethyl-m-toluidine
N-β-carboxamidoethyl-N-β-hydroxyethylaniline
N-β-casboxamidoethyl-N-β-cyanoethyl-m-toluidine
N-β-carboxamidoethyl-N-butyl-m-toluidine The 2-aminothiazoles which are diazotized and coupled with the mentioned coupling components are, for example, 2-aminothiazole, 2-amino-5-nitrothiazole, 2-amino-5-alkylsulfonylthiazoles and other 2-aminothiazoles disclosed in the examples hereinafter.

The azo compounds can be used for dyeing textile materials including synthetic polymer fibers, yarns and fabrics giving fast shades when applied by conventional dyeing methods to cellulose ester and polyester fibers. The azo compounds have moderate affinity for polyamide fibers and possess the valuable property for staining wool less than do previous thiazole dyes. When the azo compounds are used for dyeing such hydrophobic materials, they should be free of water-solubilizing groups such as sulfo and carboxyl groups. In general the dyes have good fastness, for example, to light, washing, gas (atmospheric fumes) and sublimation. The dyes are useful in application and discharge printing.

The following examples will serve to illustrate the preparation of representative azo compounds of the invention.

EXAMPLE 1

A solution of nitrosyl sulfuric acid was prepared by careful addition of 0.9 g. $NaNO_2$ to 6.25 ml. conc. $H_2SO_4$. This solution was cooled to about 3° C. and 15 ml. 1:5 acid (1 part propionic:5 parts acetic) was added below 15° C. Then, at below 10° C., 1.45 g. 2-amino-5-nitrothiazole was added, followed by 15 ml. 1:5 acid, The reaction was stirred 2 hours at 0–5° C., then added to a solution of 2.06 g. N-β-carboxamidoethyl-N-ethyl-m-toluidine in 25 ml. 1:5 acid at 5° C. Solid ammonium acetate was added until the solution turned Congo Red paper brown, coupled 2 hr., then drowned with water, filtered, and dried. The product dyes cellulose acetate and polyester fibers brilliant blue shades of exceptional depth and has the formula

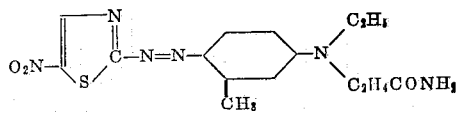

The examples in the following table are carried out in the manner of Example 1. $R_1$, $R_2$ and $R_3$ refer to the above formulas, thus the azo compound of Example 2 is prepared from 2-amino-5-nitrothiazole and N-β-carboxamidoethyl-N-ethylaniline. The color refers to dyeing on cellulose acetate textile material.

bamoylethyl; cyanoalkyl, e.g., β-cyanoethyl; cyanoalkylthio, e.g., cyanoethylthio.

The azo compounds of the invention may be used for dyeing hydrophobic fibers such as linear polyester, cellulose ester, acrylic, polyamide, etc., fibers in the manner described in U.S. Patents 2,880,050, 2,757,064, 2,782,187 and 3,043,827. The following example illustrates methods by which the azo compounds of the invention can be used to dye textile materials.

0.1 gram of the dye is dissolved in the dye pot by warming in 5 cc. of ethylene glycol monomethyl ether. A 2% Igepon T and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 min. without heat and then for 10 min. at 80° C. The dyebath is then brought to the boil and held at the boil for one hour. Following this, the fabric is rinsed in warm water, then scoured in an aqueous 0.2% soap, 0.2% soda-ash solution. After scouring, the fabric is rinsed with water and dried. Accordingly, since the azo compounds of the invention are water-insoluble, they can be applied from aqueous dispersions in the manner of the so-called "dispersed dyes." However, coloration can also be effected, for example, by incorporating the azo compound into the spinning dope and spinning the fiber as usual. The azo compounds of our invention have varying utility as dyes. The degree of utility varies, for example, depending upon the material being dyed and the formula of the azo compound. Thus, for example, all the dyes will not have the same degree of utility for the same material.

Cellulose esters which can be dyed with the azo compounds include cellulose aliphatic carboxylic acid esters

| Ex. | 2-aminothiazole diazotized | N-carboxamidoalkylaniline Coupler | | | Color |
|---|---|---|---|---|---|
| | | $R_1$ | $R_2$ | $R_3$ | |
| 2 | 5-$NO_2$ | Phenylene | $C_2H_5$ | —$CH_2CH_2$— | Violet. |
| 3 | 5-$NO_2$ | m-Tolylene | $C_2H_5$ | —$CH_2$— | Blue. |
| 4 | 5-$NO_2$ | do | —$CH_2CH_2OH$ | —$CH_2CH_2$— | Do. |
| 5 | 5-$NO_2$ | do | —$CH_2CH_2CN$ | —$CH_2CH_2$— | Do. |
| 6 | 5-$NO_2$ | m-Chlorophenylene | $C_2H_5$ | —$CH_2CH_2$— | Violet. |
| 7 | 5-$NO_2$ | m-$OCH_3$ phenylene | $C_2H_5$ | —$CH_2CH_2$— | Blue. |
| 8 | 5-$NO_2$ | 2,7-dimethyltetrahydroquinoline | Part of ring | —$CH_2CH_2$— | Do. |
| 9 | 4-$CF_3$ | m-Tolylene | $C_2H_5$ | —$CH_2CH_2$— | Red. |
| 10 | 4-$CH_3$ | do | $C_2H_5$ | —$CH_2CH_2$— | Red. |
| 11 | 4-$CO_2C_2H_5$ | do | $C_2H_5$ | —$CH_2CH_2$— | Red. |
| 12 | 4-$NHCOCH_3$ | do | $C_2H_5$ | —$CH_2CH_2$— | Red. |
| 13 | None | do | $C_2H_5$ | —$CH_2CH_2$— | Violet. |
| 14 | 4-$CH_3$, 5-$\overset{O}{\overset{\|}{C}}$—$CH_3$ | do | $C_2H_5$ | —$CH_2CH_2$— | Pink. |
| 15 | 5-CN | do | $C_2H_5$ | —$CH_2CH_2$— | Violet. |
| 16 | 5-SCN | do | $C_2H_5$ | —$CH_2CH_2$— | Red. |
| 17 | 5-Br | do | $C_2H_5$ | —$CH_2CH_2$— | Pink. |
| 18 | 5-$SO_2C_4H_9$ | do | $C_2H_5$ | —$CH_2CH_2$— | Do. |
| 19 | 4-phenyl | do | $C_2H_5$ | —$CH_2CH_2$— | Red. |

It will be apparent from the above examples that R, $R_1$, $R_2$ and $R_3$ can be varied widely to produce azo compounds very useful as dyes. In particular when $R_1$ is an arylene radical of the benzene series, it may be unsubstituted or substituted, by one of the following radicals: alkyl, especially lower alkyl; alkoxy, especially lower alkoxy and dialkoxy; halogen, e.g., bromine and iodine; carboalkoxy, e.g., —$COOCH_3$; hydroxyalkyl, e.g., hydroxyethyl; alkoxyalkyl, e.g., methoxyethyl; phenoxyalkyl, e.g., phenoxyethyl; alkylthio, e.g., ethylthio; phenylalkylthio, e.g., benzylthio; acetamido; acyloxy, e.g., acetoxy; carbamoyl, e.g., phenylcarbamoyl; acetoxyalkyl, e.g., acetoxyethyl; hydroxyl; nitro; alkylsulfonamido, e.g., methylsulfonamido; phenylalkoxy, e.g., benzyloxy; hydroxyalkoxy, e.g., β-hydroxyethoxy; haloalkoxy, e.g., β-chloroethoxy; phenoxyalkoxy, e.g., β-phenoxyethoxy; β(β'-phenoxyalkoxy)alkoxy, e.g., β(β'-phenoxyethoxy)ethoxy; carboalkoxyalkyl, e.g. —$(CH_2)_2COOCH_3$; acylaminoalkyl, e.g., acetylaminoethyl; alkylcarbamoylalkyl, e.g., β-methylcarhaving 2 to 4 carbon atoms in the acid groups thereof, by which we mean to include, for example, both partially hydrolyzed and unhydrolyzed cellulose acetate, cellulose propionate and cellulose acetatebutyrate.

Polymeric linear polyester materials of the terephthalate type are illustrative of the linear aromatic polyester textile materials that can be dyed with the new azo compounds of our invention. The terephthalate fibers sold under the trademarks "Kodel," "Dacron" and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363, for example, can be dyed. The linear aromatic polyester materials specifically named have a melting point of at least 200° C.

Nylon, in fiber yarn and fabric form, is representative of polyamides which can be dyed with the azo compounds.

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. An azo compound having the general formula

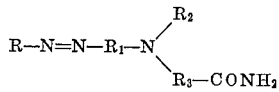

wherein
R = a monocyclic 2-thiazolyl radical
$R_1$ = a member of the class consisting of a monocyclic arylene group of the benzene series and in

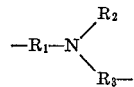

$R_1$ together with $R_2$ and the nitrogen atom form a 6-tetrahydroquinolyl radical,
$R_2$ = a member of the class consisting of hydrogen, alkyl, hydroxyalkyl and cyanoalkyl,
$R_3$ = lower alkylene, said compound being free of sulfo and carboxyl groups.

2. An azo compound having the general formula

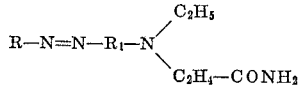

wherein R represents a monocyclic 2-thiazolyl radical and $R_1$ represents a monocyclic arylene radical of the benzene series, said radicals being free of carboxyl and sulfo groups.

3. An azo-dyestuff of the formula

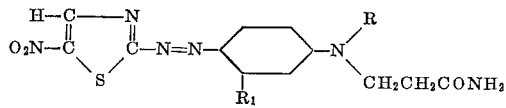

in which R represents lower alkyl, and $R_1$ represents a member selected from the group consisting of hydrogen, methyl and methoxy.

4. A compound having the formula

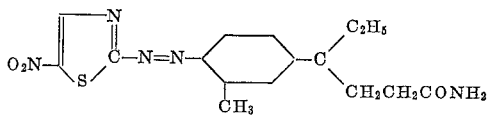

5. A compound having the formula

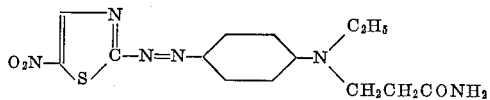

6. A compound having the formula

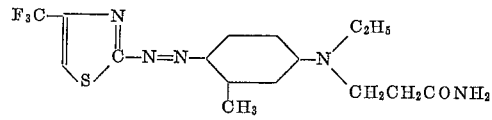

7. A compound having the formula

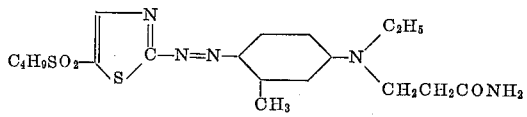

8. A compound having the formula

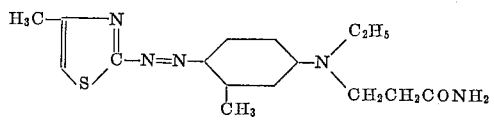

No references cited.

CHARLES B. PARKER, *Primary Examiner.*

R. J. FINNEGAN, D. M. PAPUGA, *Assistant Examiners.*